Dec. 17, 1935. A. W. ALTORFER Re. 19,787

WASHING MACHINE

Original Filed July 2, 1925 2 Sheets-Sheet 1

INVENTOR.

Alphen W. Altorfer

LaPorte & LaPorte

ATTY'S

Dec. 17, 1935. A. W. ALTORFER Re. 19,787
WASHING MACHINE
Original Filed July 2, 1925 2 Sheets-Sheet 2
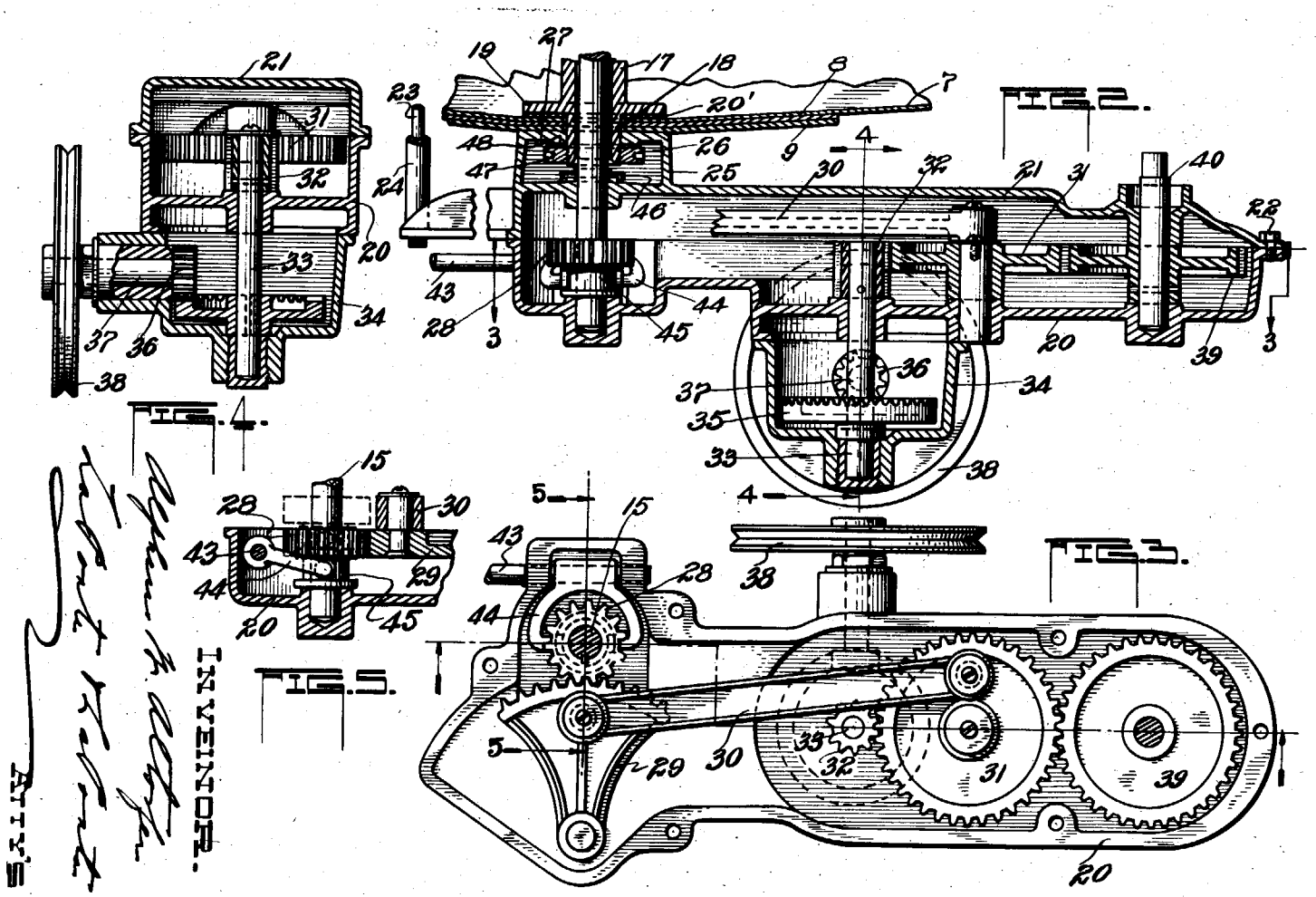

Reissued Dec. 17, 1935 Re. 19,787

UNITED STATES PATENT OFFICE 19,787

WASHING MACHINE

Alpheus W. Altorfer, Peoria, Ill.

Original No. 1,740,938, dated December 24, 1929, Serial No. 41,150, July 2, 1925. Reissue No. 18,870, dated June 13, 1933, Serial No. 567,083, October 5, 1931. Application for reissue November 8, 1934, Serial No. 752,107

10 Claims. (Cl. 259—101)

Fig. 1 is a side elevation of a washing machine, partly in section, embodying my invention, and shows the arrangement and location of the gear casing or housing in respect of the tub bottom, the manner and means of clamping or securing the bottom of the tub between the bearing portion of the post or casing and gear casing or housing and the arrangement of the drive and supporting connection for the wringer from said gear casing or housing;

Fig. 2 is a longitudinal sectional view through the gear casing or housing and shows more in detail the construction of the clamping or securing means for securing the tub bottom, post or casing and gear casing or housing as a unitary structure;

Fig. 3 is a plan view, as the same would appear if taken on the line 3—3, Fig. 2;

Fig. 4 is a cross-section, in elevation, as the same would appear if taken on line 4—4, Fig. 2;

Fig. 5 is a cross-section, in elevation, as the same would appear if taken on the line 5—5, Fig. 3.

Like characters of reference denote corresponding parts throughout the figures.

Figure 1:
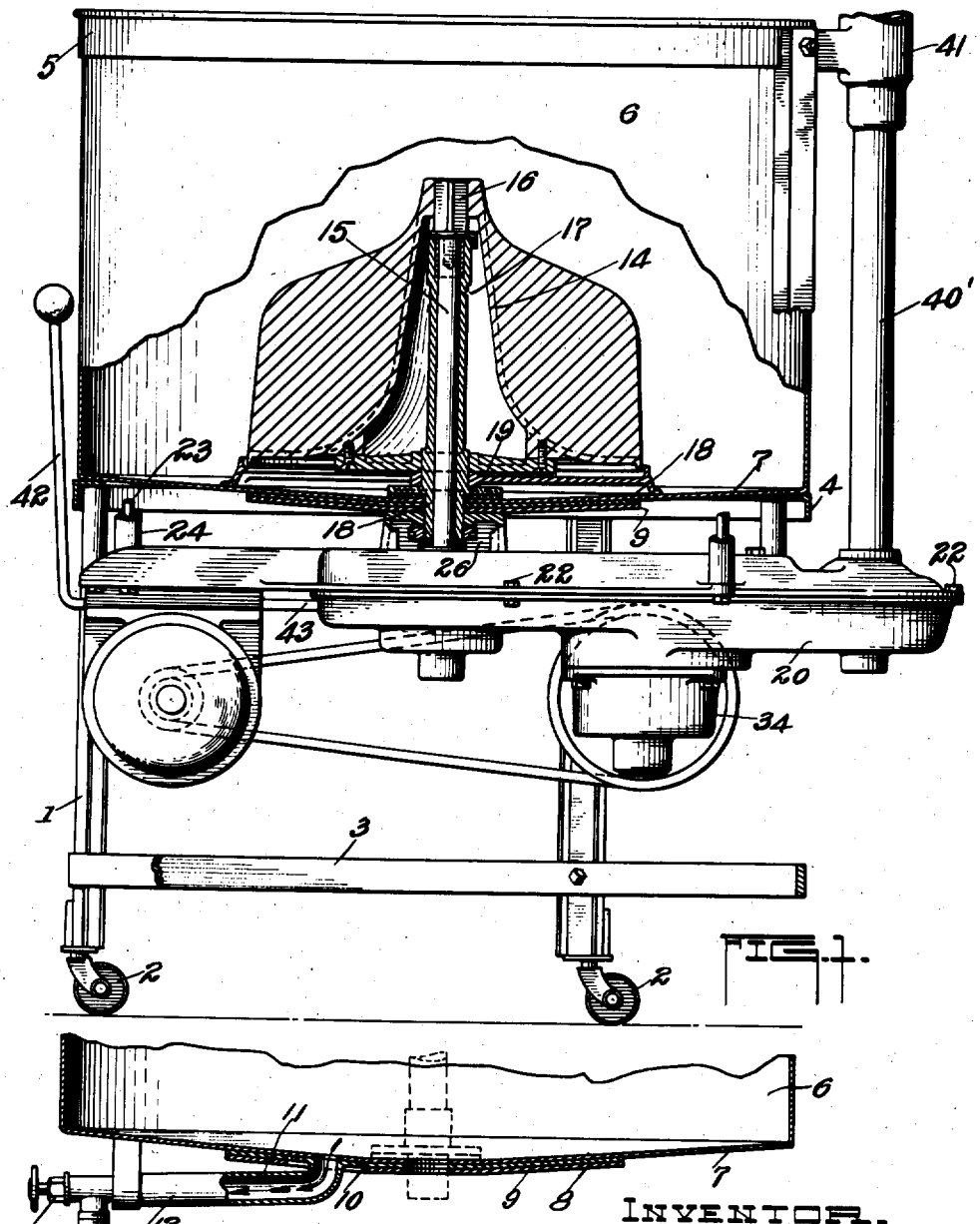
Figure 6:
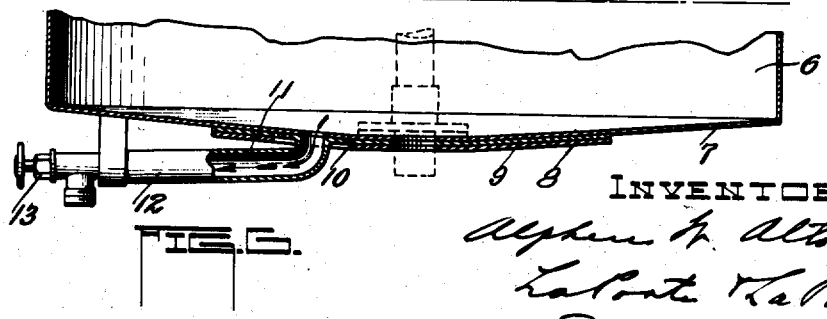
Fig. 6 is a detail in section through the tub bottom showing a bracing means and silencer against vibration and also the drain.

The frame of the machine includes a plurality of standards or legs 1 having casters 2 at their lower ends for ease and convenience in moving the machine from place to place, and a series of preferably approximately circular frames 3, 4 and 5 superimposed in spaced relation, one above the other. The frames 3 and 5 are located at or near the bottom and top of the legs or standards, respectively, as shown, and may be flat bands, whereas the frame 4 is an angular band or apron located intermediate the frames 3 and 5 and immediately beneath the tub and the latter preferably rests thereon or has securement thereto. The bottom 7 of this tub or container is dished or saucer shaped, as shown, its lowermost point being axially of the tub. It is strengthened or braced centrally by the preferably asbestos sheet or plate 8, next adjacent the outside of the bottom and held in place by the stiffening plate 9. Should there be any vibration of the tub bottom, due to the washing action, the asbestos sheet or plate will act as a silencer to prevent rumbling or thumping. Both the sheet or plate 8 and the plate 9 have an opening 10 therethrough next adjacent the center or axis of the tub through which projects a coupling 11 secured to the tub bottom and in communication therewith to act as a drain and from said coupling a drain pipe 12 extends to one side of the tub and having a regulating or drain valve 13.

The washing element 14, arranged to be suitably supported and operated within the tub or container 6 may be an agitator or dolly of any desired or approved construction. Such agitator or dolly is arranged for clutch connection to the upper end of a shaft passing up through the tub bottom 7 and arranged for operative connection with actuating mechanism located beneath the tub. As shown, the agitator or dolly may have a detachable connection with the upper end of the shaft 15 by means of a suitable coupling 16.

The bearing for the shaft 15 within the tub, comprises preferably an upstanding tubular post or casing 17 disposed through an axial opening 18 in tub bottom and through corresponding openings in the plates secured thereto and therebeneath; the greater portion of said post or casing extending up into the tub, to a point preferably above the water line therein and with an extension projecting below the tub, as shown. Said post or casing is further provided with a flanged bearing and clamping member 19 at or near its lower end, between which and the upper inside face of the tub bottom a suitable gasket or packing 20' is inserted, to form or provide a seal against leakage, such flange and gasket or packing being drawn firmly down and against the tub bottom, in a manner to be explained.

The gear casing or housing, comprises preferably elongated and suitably shaped rather shallow superimposed sections 20 and 21, adapted to be removably attached to each other by bolts 35 and nuts 22. When united and housing the operating gearing, such casing or housing is disposed below and closely adjacent the bottom of the tub and is arranged radially or diametrically thereof from a point centrally of the tub to a point outside the periphery thereof, as shown in Figs. 1 and 2. The outer or extending portion of the said casing or housing is preferably supported or suspended from the band or apron 4, by means of bolts 23, which are shown passing through spacing sleeves 24. The upper section 21 of said casing or housing, at a point where it crosses and is coincident with the axis and center of the tub, is formed or provided with an overlying shell or casing 25 having an opening 26 therethrough and the head wall 27 thereof, when the gear casing or housing is secured in position, preferably bears against the underside of the plate 9 secured to the underside of the tub bottom. Also, when the gear casing or housing is secured in assembled and operative position below the tub, as shown in Fig. 2, the dolly or agitator shaft 15 preferably passes down through the post or casing 17, and preferably through the upper wall of the section 21 and has bearing in the lower wall of the section 20. Furthermore, the lowermost end of the tubular post or casing 17 extends down, preferably terminating in the overlying shell or casing 25, stopping short of the upper wall of the section 21, as shown. This shell or casing 25 constitutes a head of materially less diameter than the length of the gear casing and of a length or depth approximating the depth of the gear casing, and is in effect an adapter, of preferably annular or cylindrical-like contour for coupling the gear casing or housing, at the center of the tub, to the lower end portion of the post or casing 17, whereby the bottom of the tub is clamped or secured between and to the post or casing and adapter, to provide a unitary and rigid like assembly between these elements; and the casing with operating mechanism therewithin, is preferably in the plane of the drive from the power unit, such as an electric motor. Furthermore, placing the shallow gear casing well up under the tub and clamping the casing and tub together, including the shaft casing, eliminates the possibility of out of alignment of the dolly operating shaft, will prevent binding and stalling of motor and insure easy running and should obviate leakage and attention usually required.

On the extreme lower end of the shaft 15 is slidably connected a pinion 28 arranged to be moved into and out of meshing relation with a segment gear or rack 29 pivotally supported within the gear casing or housing and to and within the section 20 and has connected thereto a pitman bar 30 in pivotal connection with a gear wheel 31, also journaled in said gear casing or housing and which is in mesh with a driving pinion 32 on a short vertical shaft 33 journaled in the section 20 of the gear casing or housing and a supplemental housing 34 secured to and suspended below the section 20 of said gear casing or housing. On the lower end of said short shaft 33 is secured a preferably crown gear wheel 35 which meshes an ordinary spur gear wheel 36 on a short transverse shaft 37 to which is secured a pulley wheel 38 adapted to be driven from a suitable source of power and a belt, not shown. The use of a crown gear wheel for the transmission of the power from the driving shaft to the operating shaft 15 will eliminate the fine adjustments ordinarily found necessary in machines of this character and obviates the usual thrust which is noisy and makes possible an easy, smooth and noiseless running machine. To actuate a wringer mechanism, not shown, there may be provided the gear wheel 39 located within the gear casing or housing and in meshing relation with the gear wheel 31 from which it receives its power and said gear wheel 39 adapted to operate a vertically disposed shaft 40 from which power may be transmitted to the usual wringer mechanism, not shown, although its support 41 is shown in Fig. 1.

The shaft 40 is preferably encased in the upstanding sleeve or casing 40', the lower end of which is supported from the exposed end portion of the upper section 21 of the gear casing or housing, which projects out beyond the tub, and its upper end connected with the support 41. In this arrangement, a convenient support and drive between the gear casing or housing and gearing therewithin and wringer is provided eliminating the unusually long connection heretofore made necessary and as a result doing away with much unnecessary material and thereby reducing the cost of manufacture.

The means employed to move the pinion 28 into and out of mesh with the segment gear or rack 29 is a lever arm 42 projecting up at the side of the machine and connected with a rod 43, see Fig. 3, which has secured to its inner end the yoke 44 engaging a grooved collar 45 connected with the pinion 28, whereby upon the oscillation of the rod 43 the pinion may be alternately raised and lowered as shown in dotted and full lines in Fig. 5, so as to disconnect and connect said pinion with segment gear or rack 29. This arrangement, as will be understood, permits the motor to operate continuously when the machine is in use and yet provides a simple and convenient means for the attendant to connect and disconnect the actuating mechanism of the dolly with the source of power.

When the several parts described are in assembled and in operative relation, there is carried on the dolly or agitator operative shaft 15 and within the shell or casing 25 a flanged collar 46, preferably below the end of the tubular post or casing 17 which acts as a water shed to divert any casual water which may trickle down the shaft 15 from entering the gear casing or housing, which naturally would be detrimental to an efficient operation of the gearing journaled and operating within said gear casing or housing.

The tub 6, the tubular post or casing 17 and the gear casing or housing are clamped or firmly secured in unitary arrangement, by means of a nut 47 which, as shown in Fig. 2, is screwed onto the lower end of the tubular post or casing 17 and preferably within the adapter shell or casing 25. When so applied, the nut 47 will draw the bearing flange 10 of the post or casing 17 and the head portion 27 of the adapter toward each other, firmly clamping the bottom of the tub therebetween and thereto. Between the nut 47 and the head wall 27 of the adapter 25 is interposed a gasket or washer 48, of suitable material.

The manner of assembling the tub 6, the operating shaft 15, the tubular post or casing 17, the gear casing or housing, and the firmly clamping together of the tub 6, the tubular post or casing 17 and the gear casing or housing constitute one of the novel and essential features of the structure hereinabove described. Assuming that the gear casing or housing is supported or suspended in the manner shown, the tub 6 is dropped into position between the legs or standards so as to rest on the frame 4 in the manner shown and with the plate 9 secured to the bottom of the tub in abutting relation with the head wall 27 of the shell or casing 25 superimposed on the section 21 of said gear casing or housing. The tubular post or casing 17 is then placed in position with its extreme lower end inserted through the axial opening 18 in the tub and the plates connected beneath and thereto. The lower end of said tubular post or casing will stop short of the upper wall of the section 21 of the gear casing or housing and within the shell or casing 25, as shown, superimposed thereon. The operating shaft 15 may be conveniently placed at the same time that the tubular post or casing 17 is positioned, with said operating shaft being inserted down and through the upper wall of the section 21 of the gear casing or housing and into operative relation with the pinion 28 arranged to have a slidable relation thereon. However, before, or at the same time that the tubular post or casing 17 and the operating shaft 15 are placed in position, the nut 47 and the flanged collar 46 are inserted through the opening 26 into and within the shell or casing 25 to be in axial alignment with said shaft and said tubular post or casing so that the flanged collar 46 may have a snug fit on said shaft and embrace or surround the opening in the upper wall of the section 21 of the gear casing or housing in which said shaft has a bearing, as best seen in Fig. 2 and with the nut 47 in position to be screwed on to the lower threaded end of the tubular post or casing 17. It has already been explained that between the nut 47 and the head wall 27 of the shell or casing 25, a suitable gasket or washer is placed and a suitable gasket or washer placed between the flange 19 on the tubular post or casing 17 and the bottom wall of the tub. This structure seals the connection with the tub at this point against leakage and the nut 47 when screwed into position firmly clamps the tubular post or casing 17, the tub 6 and the gear casing or housing securely together. While the upper end of the tubular post or casing 17 is normally above the water line of the tub, should any water work itself down from the top of the operating shaft 15 and through the tubular post or casing 17, it will be diverted at the lower end of said tubular post or casing 17 over the flanged collar 46 on to the top of the gear casing or housing and be prevented from entering such gear casing or housing around said operating shaft 15 where it has a bearing in the upper wall of the section 21 of said gear casing or housing. This condition is not likely to exist but as a safeguard I have provided this water shed in the form of the flanged collar 46.

As will be apparent, power is transmitted from the shaft 37 through the pinion 36 and crown gear 35 to the gear wheel 31 which will impart reciprocal movement to the pitman bar 30 and oscillate the rack or segment gear 29 and alternately rotate the dolly shaft 15 in opposite directions, when the pinion 28 is in mesh with said rack. The pinion is arranged to be manually raised and lowered out of and into engagement with said rack, through and by means of the operator's level 42.

What I claim is:

1. In a washing machine, in combination, a frame including standards and connecting annular rings, a gear casing supported by and suspended from one of said rings, a tub adapted to rest on said last mentioned ring, a tubular post extending through the bottom of said tub, and a nut adapted to engage the lower end of said post to clamp the post and tub and casing together.

2. In a washing machine, in combination, a frame including standards and connecting annular rings, a gear casing supported by and suspended from one of said rings, a tub adapted to rest on said last mentioned ring, a tubular post extending through the bottom of said tub, a dolly shaft journaled in said post and casing, a nut adapted to engage the lower end of said post to clamp the post and tub and casing together, and a flanged collar on said shaft below the lower end of said post adapted to act as a water shed.

3. In a washing machine, a tub having a saucer shaped bottom, and a vibration silencer for said bottom to prevent rumbling comprising a vibration silencing material lying next adjacent the bottom of said tub and a plate lying next adjacent to and below said material.

4. In combination with a washing machine tub and supporting means therefor, the tub having an opening in its bottom at the axis thereof, a gear casing having substantially parallel top and bottom walls and relatively narrow side walls whereby to provide a casing of relatively shallow depth, a head projecting upwardly from the upper face of the top wall of the casing a distance approximating the depth of the casing and forming therewith a housing member and having a top portion engaged with the under face of the bottom of the tub so as to space the top of the casing a distance below the bottom of the tub, said head being of a diameter materially less than the length of the casing and providing a firm seat against which the bottom of the tub abuts, a tubular post extending through the top portion of the housing member for receiving the dolly shaft of the washing machine alined with the opening in the tub, means associated with the head to rigidly connect said tubular post to the head and to clamp the tub bottom between the post and the head, and other means connected to the casing and to the tub and located at points remote from the head and extending across the space between the top of the casing and the bottom of the tub for holding the casing with its said head in firm and rigid engagement with the bottom of the tub.

5. In combination with a washing machine tub and supporting means therefor, the tub having an opening in its bottom at the axis thereof, a gear casing having substantially parallel top and bottom walls and relatively narrow side walls whereby to provide a casing of relatively shallow depth, a head projecting upwardly from the upper face of the top wall a distance approximating the depth of the casing and forming therewith a housing member and having a top portion engaged with the under face of the bottom of the tub so as to space the top of the casing a distance below the bottom of the tub, said head being of a diameter materially less than the length of the casing and providing a firm seat against which the bottom of the tub abuts, a tubular post for receiving the dolly shaft of the washing machine alined with the opening in the tub and extending through the top portion of the head, said tubular post having an outwardly projecting portion which seats against the bottom of the tub and unitary means in said housing member for simultaneously securing said projecting portion of the tubular post to the bottom of the tub and also the head to the bottom of the tub with the said bottom of the tub located between said projecting portion of the tubular post and the head.

6. In a washing machine in combination, a frame including standards and connecting annular rings, a tub adapted to rest on one of said rings, a gear casing supported by and suspended from the latter of said rings, a constantly driven wringer shaft having a portion located within said casing, a driving shaft, geared connection between said driving shaft and wringer shaft, a vertical oscillating agitator shaft projecting through the bottom of the tub and having a portion within the housing, means connecting the wringer and agitator shafts to oscillate the agitator shaft, a tubular post extending through the bottom of said tub and surrounding the vertical agitator shaft and means for clamping the lower end of the tubular post, the tub and the gear casing together.

7. In a washing machine in combination, a frame including standards and connecting annular rings, a gear casing supported by one of said rings, a tub adapted to rest on the last mentioned ring, said gear casing having a portion lying in contact with the bottom wall of the tub, a tubular post extending through the bottom of the tub and into the casing, said tube carrying means to attach the tub and casing together.

8. A washing machine having in combination, a frame including standards and connecting annular rings, a gear casing supported by one of the rings, a tub adapted to rest upon the last mentioned ring, said casing having a faced portion lying in contact with the central portion of the bottom wall of the tub, and a portion extending beyond the outer periphery of the tub, a first tubular post extending through the bottom of the tub and into said casing, a second tubular post disposed outside the tub having one end connected with said portion of the casing extending beyond the tub and the opposite end connected with one of said annular rings and means for attaching said first tubular post to the casing and bottom wall of the tub.

9. A washing machine having in combination, a frame including standards and connecting rings, a gear casing supported by one of the rings, a tub adapted to rest upon the last mentioned ring, said casing having a portion lying below the central portion of the tub and extending to a point beyond the outer periphery of the tub, a first tubular post extending through the bottom of the tub and into the casing, means on the post for attaching the post and the bottom wall of the tub to the casing, a vertical agitator shaft disposed in the tubular post and extending into the casing to a point below the lower end of said tube, and a second tubular member attached to said portion of the casing extending beyond the periphery of the tub.

10. In a washing machine, in combination, a frame including standards and connecting annular rings, a gear casing comprising a complete unitary cover structure capable of completely enclosing the operating gear of a washing machine, said casing being bodily supported from one of said rings, a tub adapted to rest upon the last mentioned ring, a hole in the bottom of the tub, a tubular post disposed in the tub, an opening in said casing in register with said hole in the tub, said post extending through said hole and opening into said casing and means on the post for supporting the post in the casing and holding a portion of the post in water tight pressure contact with the bottom wall of the tub.

ALPHEUS W. ALTORFER.